April 10, 1951   H. C. MELLA   2,548,488
MOVING ROUTE INDICATOR
Filed Dec. 4, 1947
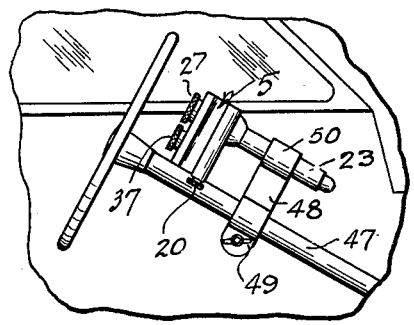
Fig. 1.
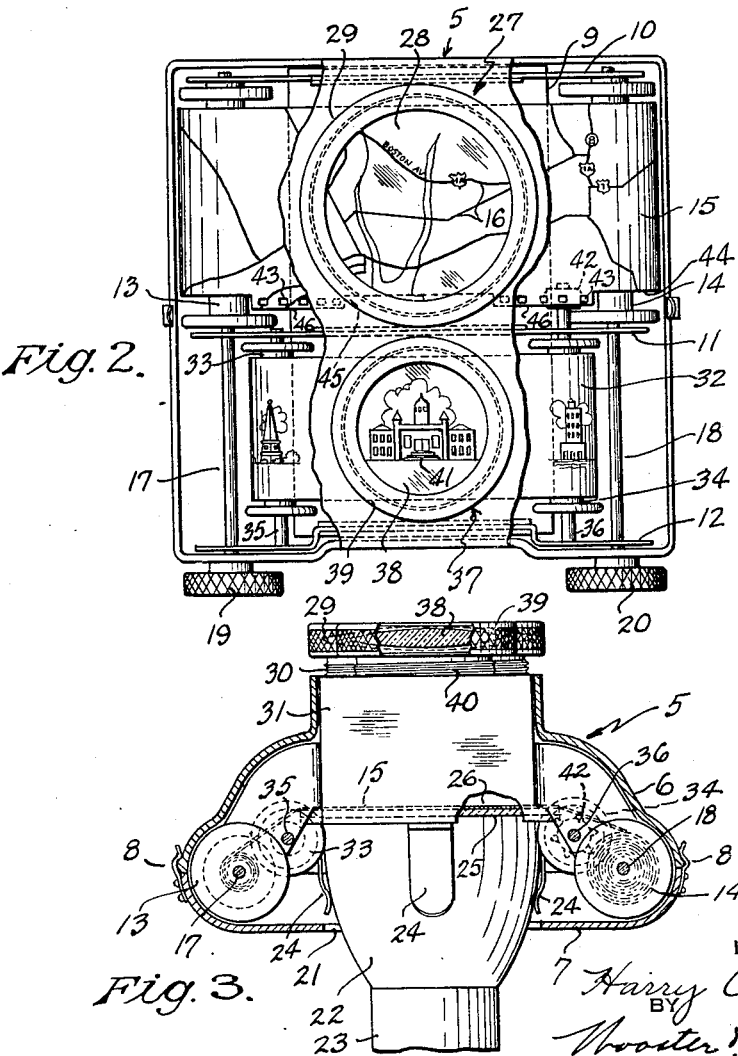
Fig. 2.
Fig. 3.
INVENTOR
Harry C. Mella
BY
Wooster & Davis
ATTORNEYS Patented Apr. 10, 1951

2,548,488

UNITED STATES PATENT OFFICE 2,548,488

MOVING ROUTE INDICATOR

Harry C. Mella, Fairfield, Conn.

Application December 4, 1947, Serial No. 789,634

4 Claims. (Cl. 40—86)

This invention relates to an indicator to assist the driver of an automobile in following a given route, and has for an object to provide an improved device which may be mounted on the steering column in front of the steering wheel, where it may be readily viewed by the driver with a minimum shifting of his eyes from the road in front.

Another object is to provide a device of this character which may be readily and quickly mounted on the head of a standard flashlight mounted on the steering column or other suitable support in such a position that the light from the flashlight may be employed to illuminate a film or strip of paper on which is a map of the route to be followed.

A further object is to provide a device of this character with means for holding a film or strip of material of any desired length, depending on the length of the route to be followed, with means for readily shifting the strip or map past an illuminating means and a viewing means for the illuminated section of the map, as the driver proceeds along the route.

A still further object is to provide a device in which, in addition to the map and means for shifting it in front of the viewing means, there is an additional strip provided with photographs or drawings of certain important landmarks or other identifying features, which is synchronized with the map so that when the map is shifted to a given position a given photograph or other landmark indication will be visible in an auxiliary viewing device to assist the driver in following the route designated.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side view showing the device applied to the steering column;

Fig. 2 is a front or top view partially in plan and partially broken away to more clearly show the construction, and Fig. 3 is a transverse section.

The device in the form illustrated comprises a casing 5 including two sections, a body section 6 and a detachable rear or cover section 7, which may be secured to the body section by any suitable means, such, for example, as the spring clips 8. Mounted in the casing is a frame 9 extending substantially the length of the casing and provided with supporting arms or plates 10, 11 and 12 for supporting spools 13 and 14 for a transparent strip of film 15, or strip of paper or other suitable material, on which is drawn a map with lines 16 indicating one or more routes, such, for example, as a road map drawn similar to the standard road maps, indicating different routes and the number of the routes. Associated with each spool for mounting and operating it is a shaft 17 for the spool 13, and a similar shaft 18 for the spool 14 mounted in the supports 11 and 12, and projecting through one side of the casing where they are provided with knurled hand grips or knobs 19 and 20 for rotating these shafts and the spools 13 and 14 for shifting the film or other strip 15 carrying the map.

In the rear wall of the casing is an opening 21 to receive the head 22 of a standard flashlight 23 comprising the usual casing carrying a battery and a manually operated control switch (not shown), or if preferred, the light in the head of the casing may be connected to the electrical system of the car and controlled by a suitable hand switch. In the casing and preferably carried by the frame 9 is a series of spring clips 24 to receive and grip the curved or tapered head 22 of the flashlight and mount this device thereon. The frame carries a ground glass 25 which may be held in the frame by any suitable means, such, for example, as lugs or clips (not shown). When the device is in position on the flashlight, this glass lies over the lens of the flashlight and operates to separate the intermediate portion 26 of the film or strip 15 and to support it in a flat position over the light where it is clearly illuminated from the underside or rear by the flashlight. Mounted in the front wall of the casing is a viewing device 27. This may be merely a plain glass in a suitable supporting means directly over the flat portion 26 of the map, but preferably it comprises a magnifying or reading glass 28 mounted in a suitable frame 29 carried by a threaded tube 30 threaded into a tubular portion 31 of the frame 9 to permit focusing of the lens 28 on the map by turning this support to shift the lens toward and from the strip 15. The frame 9 with its various elements is of a size and shape to substantially fit the inner side or space of the casing 5. It may be merely inserted in the casing through the lower open side thereof, and its fit therewith will retain it in the casing. It will be prevented from falling out by the closure 7. It will also be held by the tubular portion 31 and a similar portion for the glass 38 fitting in the tubular extensions in the top of the casing, as shown in Fig. 3. These features will effectively hold the frame in position, but if found desirable suitable clips or other holding means could be provided in the casing.

Located laterally of the film or strip 15 is an auxiliary strip or film 32 mounted on suitable spools 33 and 34 detachably carried by suitable shafts 35 and 36 mounted in the members 11 and 12 of the frame, and this strip is carried between the spools under a reviewing device 37 similar to the device 27, and also preferably including a reading or magnifying glass 38 mounted in a suitable frame 39 carried by a threaded tube 40, also mounted for adjustment in the frame to permit focusing of this viewing device on any photograph 41 or drawing or other designation on the strip 32. The shifting of this strip under the viewing device 37 is controlled by shifting of strip or film 15. For this purpose there is mounted on shaft 36 a toothed wheel 42, the teeth or pins of which are adapted to seat in feed and guide perforations 43 along one edge of the film or strip 15. This is similar to the feed and guide perforations along the edge of motion picture film, and this row of openings may be continuous if it is desired that the strip 32 move continuously with the strip 15; or, if it is desired that the strip 32 be shifted only at designated times for given movements of the strip 15, then the edge of the strip 15 may be notched or portions removed, as indicated at 44 and 45, leaving short strips 46 in which the openings 43 are formed. Therefore, during certain movements of the strip or film 15, when one of the notches 44 or 45 is over the wheel 42, movement of the strip 15 will have no effect on the strip 32, but when one of the sections 46 provided with the openings 43 passes over this wheel, then the teeth on the wheel will enter the openings 43 and shift the strip 32 by rotating the spool 34.

Each of the spools 13, 14, 33 and 34 is removably mounted in the frame so that the film or strip 15 carrying the map and the strip 32 carrying the photographs or other designations may be readily changed or renewed. Strip 32 may have photographs, for example, 41, of a town hall or other prominent building in a certain town through which the followed route on the map 15 passes, or some other prominent building or landmark of this particular town where a change of route is to be made, or a sharp turn made or a similar change from the normal straight route is to be effected.

Although it is preferred that the strip 15 be a transparent film, such, for example, as a photographic film, it may be a strip of any suitable material, such, for example, as white paper, which will transmit sufficient light from the flashlight or other illuminating means so that the map or other designation of the route on the strip may be readily viewed and followed. It is contemplated that films or strips will be made available for the best routes between different cities or locations, and the motorist may buy this strip for the desired route and easily and quickly place it in this device, where it may be readily followed to his destination. In making such a film, a route on a map may be photographed on a film forming a negative, and then a positive film made from this negative for use in this device; or the maps of the preferred routes could be printed on the film or strip of paper or other suitable material.

It will be seen the device may be readily mounted in the most convenient position for viewing and following by the driver, with minimum of interference with his driving, and that as it is mounted on the head of a flashlight or other illuminating device the map of the route to be followed is effectively illuminated. Also, the operation of mounting or dismounting the device may be easily and quickly performed. Any simple means may be provided for mounting the device on the steering column 47, such, for example, as a spring bracket 48 which may be clamped to the column by any suitable means 49 and including spring jaws 50 to grip the body of the flashlight 23. This also permits adjusting of the device to different positions on the steering column so that it may be shifted and positioned where the route map may be easily and clearly examined.

Having thus set forth the nature of my invention, I claim:

1. A route indicator of the character described comprising a flexible strip provided with a map of the route to be followed, a viewing means, means for shifting the strip past the viewing means, a second strip provided with designations of specific land marks along the route, a viewing means for the second strip, and means for shifting the second strip past its viewing means in synchronism with the first strip comprising a series of spaced groups of openings in the first strip, a toothed wheel in position to intermittently mesh therewith, and means operated by the toothed wheel for shifting the second strip.

2. A route indicator of the character described comprising a flexible strip provided with a map of the route to be followed, a viewing means, means for shifting the strip past the viewing means, a second strip provided with designations of specific land marks along the route, a viewing means for the second strip, and means operated by movement of the first strip for shifting determined portions of the second strip into reviewing positions in the second viewing means comprising driving means along one edge of the first strip, means for shifting the second strip, and driving means for the latter shifting means cooperating with and operated by the driving means in the first strip.

3. A route indicator of the character described comprising a casing, spaced spools carrying a flexible strip provided with a map of the route to be followed, a viewing means over said strip, a second set of spools carrying a flexible strip provided with designations of specific land marks along the route, a viewing means over the second strip, manual means for operating the first spools to shift the first strip past its viewing means, said strip being provided with a line of openings along one edge, and a toothed wheel adapted to cooperate with said line of openings to be turned by movement of the first strip and connected with one of the spools for the second strip to operate said spool to shift the second strip past its reviewing means.

4. A route indicator of the character described comprising a casing, a frame in the casing, means in the frame for carrying spools supporting a flexible strip, a viewing means above the strip, means in the frame for carrying spools supporting an auxiliary strip at one side of the first strip, a viewing means over the second strip, said first strip being provided with a series of perforations along one edge arranged in spaced groups, a toothed wheel connected with a spool of the auxiliary strip to shift said latter strip and arranged to be operated by said groups of perforations on movement of the first strip, and means for shifting the first strip past its viewing means.

HARRY C. MELLA.

REFERENCES CITED

The following references are of record in the file of this patent:

UNITED STATES PATENTS

| Number | Name | Date |
|---|---|---|
| 1,291,710 | Arter | Jan. 21, 1919 |
| 1,508,182 | Guthrie | Sept. 9, 1924 |
| 1,729,660 | Farmer | Oct. 1, 1929 |
| 1,833,595 | Samson et al. | Nov. 24, 1931 |
| 1,844,542 | Cook | Feb. 9, 1932 |
| 1,957,378 | Zimmerman | May 1, 1934 |
| 2,175,926 | Smith | Oct. 10, 1939 |
| 2,337,567 | North et al. | Dec. 28, 1943 |
| 2,501,840 | Bradford | Mar. 28, 1950 |